Dec. 14, 1937. G. H. MILLER 2,102,084
METHOD OF AND APPARATUS FOR TREATING BEEF CARCASSES
Filed Aug. 11, 1934
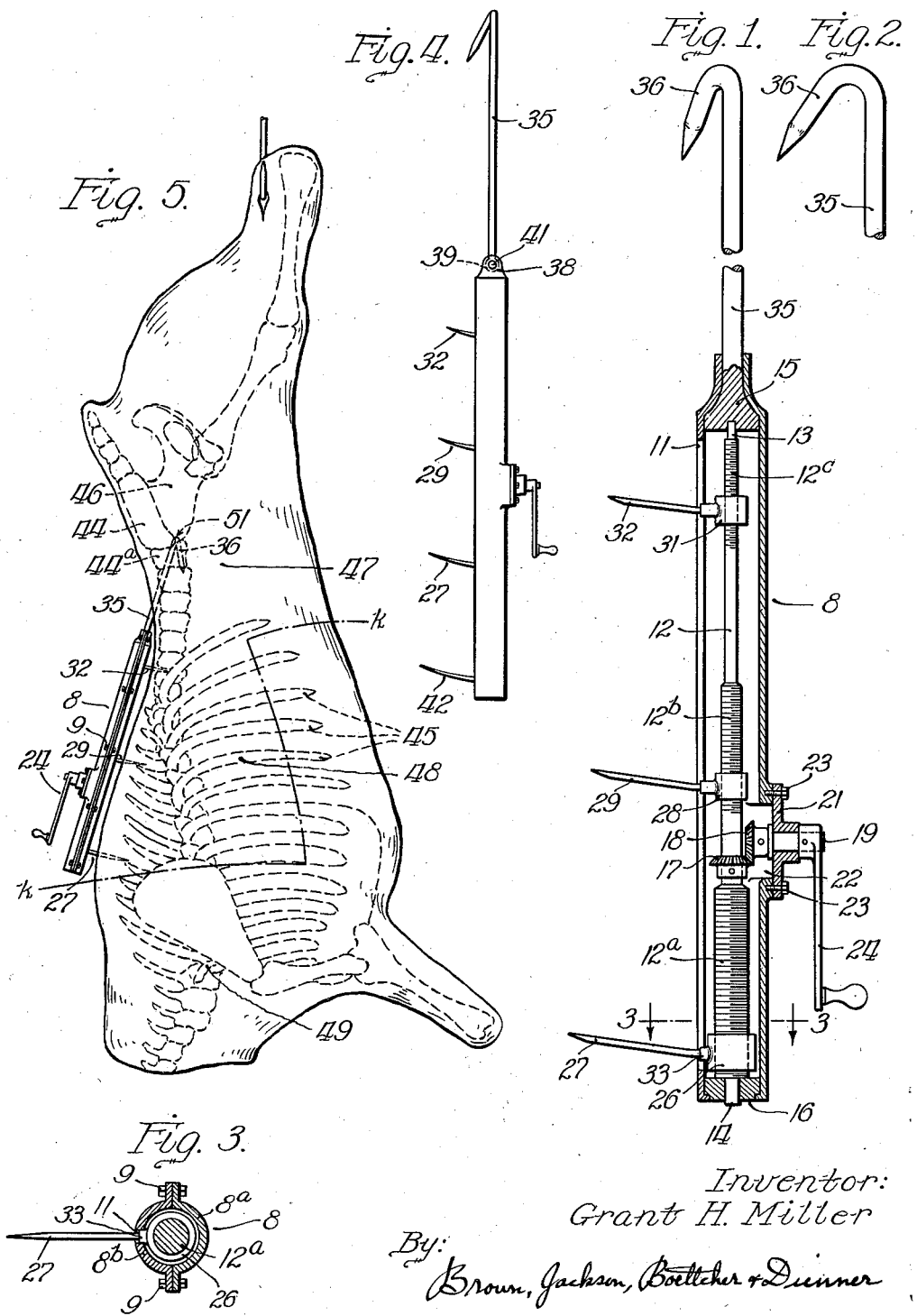
Inventor:
Grant H. Miller
By: Brown, Jackson, Boettcher & Dienner
Attys.

Patented Dec. 14, 1937

2,102,084

UNITED STATES PATENT OFFICE 2,102,084

METHOD OF AND APPARATUS FOR TREATING BEEF CARCASSES

Grant H. Miller, Caldwell, N. J.

Application August 11, 1934, Serial No. 739,429

21 Claims. (Cl. 17—44)

The present invention relates to an improved method of and apparatus for treating beef carcasses. In conventional slaughter house practice, the carcass is suspended at each hind leg on overhead tracks for dressing and splitting. After the desired internal organs have been removed, the carcass is split down the chine or backbone into right and left halves. At this time, some of the meaty portions of the carcass will frequently sag or droop down to abnormal positions on the frame of the carcass. Different factors contribute in producing this effect, such as the animal heat which is still retained to a considerable degree in the carcass, and the fact that the carcass is suspended from the hind leg with the heavier forequarter lowermost. Also, the splitting of the carcass through the chine bone severs muscular fibers in that portion of the meat adjacent to the chine bone, and, in some instances, the chipping or cracking of the chine bone in the faulty splitting of the carcass will weaken the ability of each split half of the bone to carry the weight of the flesh hanging therefrom. The result of this tendency of the meat to sag or droop relatively to the frame is that frequently there will be an appreciable downward displacement of a considerable part of the meat lying in the region of the loin, rib and chuck, this being particularly true in heavy or beefy cattle. That is to say, compared to the distribution of the meat on the animal when standing on the hoof, a considerable part of the loin meat will sag down into the rib area, and a considerable part of the rib meat will sag down into the chuck area. The chilling of the carcass in this condition entails an appreciable loss because the carcass appears more thin in those sections of more expensive cuts. The loin area is rather definitely determined by the bone structure, and the same is true of the rib and chuck portions. Hence, it will be seen that if a considerable part of the more expensive meat which was normally in the loin area of the live animal has sagged into the rib area, it must nevertheless be sold as rib meat, and if a considerable part of the meat normally in the rib area has sagged down into the chuck area, which is a much cheaper cut, it must nevertheless be sold as chuck meat.

A general object of the invention is to provide an improved method of and apparatus for restoring this displaced meat to its normal position on the frame of the carcass. The apparatus which restores this displaced meat to its normal position is left on the carcass until the carcass has been chilled, and thereafter the meat will remain in this normal position after the removal of the apparatus.

Another object of the invention is to provide improved apparatus which will raise different portions of the displaced meat different distances on the carcass frame. For example, the heavier mass of meat around the shoulder and in the chuck will sag a greater distance, the lesser amount of meat in the rib area, particularly near the prime rib end, will sag a lesser distance, and the meat in the loin area will sag a still lesser distance. Accordingly, to meet these conditions, I have developed improved apparatus which will raise the meat in the chuck area the greatest distance, will raise the meat in the rib area a lesser distance, and will raise the meat in or adjacent to the loin area a still lesser distance.

Other objects and advantages of my invention will appear from the following detail description of one preferred method of and apparatus for carrying out the invention.

In the accompanying drawing illustrating the same:—

Figure 1 is a vertical sectional view through my improved tool;

Figure 2 is a fragmentary side view of the prong or fastening device for securing the tool to the carcass;

Figure 3 is a transverse sectional view taken on the plane of the line 3—3 of Figure 1;

Figure 4 is an elevational view of a modified construction; and

Figure 5 illustrates the tool applied to a side of beef.

The main body of the tool comprises a substantially tubular housing 8 which is preferably divided longitudinally into two housing sections 8a and 8b, as shown in Figure 3. Vertical flanges along the meeting edges of the housing sections are adapted to receive connecting bolts or screws 9, which join the housing sections together. A vertical slot 11 extends down the middle of the housing section 8b.

As shown in Figure 1, a shaft 12 extends substantially axially of the tubular housing 8. Bearing ends 13 and 14 on this shaft have bearing support in end heads 15 and 16, respectively, carried by the housing. The shaft is rotated through a bevel gear 17 pinned to the shaft, this gear being driven by another bevel gear 18 which is pinned to a transverse shaft 19. The shaft 19 is journaled in the hub portion of a bearing plate 21 which is secured over an opening 22 in the housing section 8a. The plate 21 is secured to the flanged margin of the opening 22 by cap screws 23, or in any other desired manner. A crank handle 24 is fastened to the outer end of the shaft 19, and by the rotation of this handle the vertical shaft 12 can be rotated in either direction.

The shaft 12 has three separate threads 12a, 12b, and 12c formed thereon at different points along its length. Screwing over the thread 12a is a circular nut 26 having meat engaging means in the form of a prong 27 extending therefrom; screwing over the thread 12b is a similar nut 28 having a prong 29 extending therefrom; and screwing over the thread 12c is a nut 31 having a prong 32 extending therefrom. Each prong 27, 29, and 32 projects outwardly through the vertical slot 11 in the housing and is preferably inclined upwardly at a slight angle. The inner end of each prong is mounted in a boss 33 projecting laterally from the side of its respective nut, and this boss preferably extends into the slot 11 to provide a more extended area of guide surface for holding the nut against turning. The three threads 12a, 12b and 12c decrease in pitch in the order named, i. e., the bottom thread 12a has fewer threads to the inch than the intermediate thread 12b, and the intermediate thread 12b has fewer threads to the inch than the top thread 12c. Hence, for a given amount of rotation of the shaft 12, the lower prong 27 will move upwardly a greater distance than the intermediate prong 29, and this intermediate prong 29 will move upwardly a greater distance than the upper prong 32. The shaft 12 is formed of different diameters for the different threads in order to permit the mounting of the intermediate nut 28. As a modified arrangement, the shaft might be formed of one diameter by having this nut 28 of split construction adapted to clamp over the shaft, the split construction of nut then being necessary with the threads all of the same diameter, because the upper and lower threads are of different pitches than the intermediate thread.

Extending from the upper end of the casing is a rod 35 provided with anchoring or attachment means in the form of a hook formation 36 at its upper end, this hook having a pointed extremity. The hook is adapted to be suitably anchored to the carcass, preferably by effecting a hooked engagement over a portion of the chine bone. In the construction illustrated in Figure 1, the rod 35 is suitably attached to the casing 8 so as to form a rigid extension from the upper end of the casing. The threads 12a, 12b and 12c are each longer than the distances that the meat is ordinarily displaced on the frame of the carcass by the lifting action of any one of the prongs so that the threads enable the distances between the hook formation 36 and the prongs to be adjusted for different lengths of carcasses, if such adjustment should be desired. In this regard, the rod 35 might be constructed to be adjustable in length, if desired.

The modified construction illustrated in Figure 4 shows the rod 35 as having a pivoted attachment to the casing 8. A pair of spaced lugs 38 project upwardly from the end of the casing, and the rod 35 has an apertured eye 39 disposed between said lugs. A pivot pin 41 passes through the lugs and through the apertured eye for establishing the pivotal connection between the rod and the casing. It will be understood that the device may be provided with a greater or lesser number of prongs for engaging in the carcass, and in the modified construction illustrated in Figure 4 I have shown an additional prong 42 arranged below the prong 27 and adapted to engage in the chuck of the carcass. This fourth prong would be operated from a separate thread, in the same general manner described above, having a faster rate of lift than the prong 27.

In Figure 5 I have illustrated a typical side of beef for showing the application of my invention thereto. The skeleton of the carcass includes the chine or backbone, indicated in its entirety at 44, from the forward vertebrae of which extend the ribs 45. The aitchbone, which is a part of the chine bone, is indicated at 46. The loin section is indicated generally at 47, the rib section at 48 and the chuck section at 49, these indications being more or less approximate.

In the use of the tool, the hook end 36 is suitably engaged in the hind quarter of the carcass at a point which will be capable of withstanding the required tensional force. The preferred point of engagement is indicated at 51, this point being over that vertebra 44a which joins the main series of vertebrae with the forward end of the aitchbone 46. The rear vertebra 44a forms a shoulder adjacent to its point of juncture with the aitchbone, which shoulder affords a convenient and effective point of support for the hook 36. The hook is engaged with said vertebra from the inner side of the side of beef, the pointed prong being pressed outwardly toward the outer or flesh side of the beef. The tool is swung around to a position adjacent to the back profile edge of the carcass for impinging the prongs 27, 29 and 32 into the meat adjacent to this back profile edge. The prongs are forced into the meat in a path approximately parallel to the plane of cleavage of the carcass, or in a plane inclined inward slightly in a direction from the outer or fleshy side of the carcass toward the inner or rib side thereof. When the tool is applied to the carcass, the prongs 27, 29 and 32 have previously been threaded down to substantially the lowermost points in their paths of travel in the casing 8. With the prongs properly forced into the meat, the crank handle 24 is now revolved in the proper direction for causing the prongs to move upwardly relatively to the casing. The prong 27 engages in a part of the carcass where the meat is very thick, this being near the shoulder, either in what is normally the rear part of the chuck or the forward part of the rib section. Because of the considerable thickness of the meat in this area of the carcass, the meat can be displaced a greater distance upwardly, and hence the prong 27 is made to rise with a higher rate of motion during the rotation of the crank handle 24. The intermediate prong 29 engages in a part of the carcass where the meat is not quite so thick, this being approximately midway in the length of the rib section 48. This meat cannot be lifted as far without the possibility of tearing it from the ribs or cutting it by the prong, and hence the prong 29 is not advanced through the same distance as the lower prong 27. The upper prong 32 engages in a part of the carcass where the meat is still thinner than in the rib section, this point of the carcass being approximately at the nose end of the loin. Because of the lesser thickness of the meat in this area, the prong 32 is caused to rise a still lesser distance than the prong 29, in order to avoid any possibility of tearing the meat from the ribs or cutting the meat under the pressure of the prong. The different distances of travel of the three prongs are so proportioned that the different parts of the flesh portion of the carcass are properly raised relatively to the bone structure so that the meat is caused to assume more or less the normal position which it had on the frame of the animal when the animal was on the hoof. A supplementary advantage of lifting the meat in this manner is that the lifting pressure also acts to close or substantially close any break in the chine bone. Furthermore, it takes up looseness or space between the vertebrae, increasing the appearance of a short "blocky" carcass, which is desirable. Still another desirable action taking place in the shifting of the meat in this manner is that some of the meat on the outer side or midside section, i. e., intermediate the left and right edges of the carcass as viewed in Fig. 5, is shifted in a lateral direction toward the backbone edge of the carcass. Hence, the meat is further bunched or increased in thickness adjacent to this edge of the carcass, which enhances the value of the carcass. This action follows from the fact that the upward pull on the meet at the points engaged by the prongs exerts a diagonal pull upwardly and laterally on the meat of the midside section, thereby shifting some of this meat laterally toward the backbone portion of the carcass. It will be understood that this operation of lifting the meat is performed while the carcass is still warm with its animal heat, at which time the meat can be readily lifted relatively to the skeleton or frame. Thereafter, the carcass is chilled in a cooling room, whereupon it becomes set so that the meat remains substantially in this lifted position. After the carcass has become set, the tool can be removed. It will be noted that the use of the tool does not interfere with the use of a shroud cloth, which is frequently fastened to the outside of the side of beef by skewer pins for bleaching the meat.

In kosher kills, only the plate and chuck constitute the acceptable kosher meat, this corresponding to that portion of the carcass lying forward and below the kosher line approximately indicated at k—k in Figure 5. This portion of the carcass is cut away before the carcass is chilled. In tools which are likely to be employed on kosher cattle, the parts are preferably so proportioned or adjusted that the lower prong 27 engages in the carcass at a point above the kosher line, substantially at the forward end of the rib area. For use with cattle which are not kosher kills, it may be desirable at times to lift a considerable part of the meat in the chuck section, and for this purpose a tool having four prongs, such as is illustrated in Figure 4, may be employed, with the lowermost prong 42 engaging in the chuck at a relatively low or forward point.

If desired, the rates of travel of the prongs in either the three-prong or four-prong embodiment may be so proportioned as to cause a thickening or bunching of the meat in a particular part of the carcass. For example, the rate or distance of travel of the prongs 27 and 29 may be proportionately higher than the rate or distance of travel of the uppermost prong 32, so that the meat in the rib area between the prongs 29 and 32 is caused to be thickened. It will be understood that this is an optional feature which can be incorporated in the machine by the proper proportioning of the pitches of the threads on the shaft 12.

If desired, the machine may be constructed so that the hook formation 36 will be adapted for engagement over the upper end portion of the aitchbone 46 instead of over the vertebra 44a.

While I have illustrated and described what I regard to be the preferred method of and apparatus for carrying out my invention, nevertheless it will be understood that such are merely exemplary and that numerous modifications may be made therein without departing from the essence of the invention.

I claim:—

1. A device for treating an animal carcass comprising anchoring means for establishing a point of reaction by anchoring attachment to the hind quarter of the carcass, engaging means for engaging the meat at a plurality of desired points in and adjacent to the forequarter of the carcass, and means operative to cause relative shifting movement between said anchoring means and said engaging means for displacing the meat relatively to the frame of the carcass.

2. The method of treating an animal carcass which comprises displacing a part of the meat independently of the frame of the carcass in a direction toward the loin thereof, and holding the meat substantially in its displaced position until the carcass has been chilled and become set.

3. The method of treating a suspended beef carcass which comprises displacing a part of the meat in the forequarter of the carcass in an upward direction independently of the frame of the carcass, and holding this meat substantially in its displaced position until the carcass has been chilled and become set.

4. The method of treating a suspended beef carcass which comprises establishing a point of reaction in the hindquarter of the carcass, engaging a part of the meat below this point of reaction, establishing an upward pull between this meat and the point of reaction to raise the meat relatively to the frame of the carcass, and holding the meat substantially in its raised position until after the carcass has become set.

5. The method of treating a suspended beef carcass which comprises establishing a point of reaction in the hindquarter of the carcass, engaging the meat of the carcass at a plurality of points below said point of reaction, creating an upward pull between the meat and said point of reaction and causing the meat at said plurality of points to be raised different distances relatively to the frame of the carcass, and holding the meat in such raised relation until after the carcass has become set.

6. The method of treating a suspended beef carcass which comprises engaging a prong in the meat on the forequarter of the carcass, establishing a point of reaction in the carcass above said prong, creating a tension between said prong and said point of reaction to raise the engaged meat relatively to the frame of the carcass, and holding the meat in such raised relation until after the carcass has become set.

7. The method of treating a suspended beef carcass which comprises engaging a plurality of prongs in the meat of the carcass adjacent to the rib and loin sections, establishing a point of reaction in the carcass above said prongs, creating an upward pull between said prongs and said point of reaction, and causing said prongs to be raised different distances for lifting different portions of the meat different distances relatively to the frame of the carcass, and holding the meat in such raised relation until after the carcass has become set.

8. The method of treating an animal carcass which comprises engaging the carcass at two longitudinally separated points adjacent to the backbone, creating a tensional pull between said points to compress the backbone, and holding the carcass substantially in this condition until after the carcass has been chilled and become set.

9. A device for treating an animal carcass comprising attachment means for attachment to the carcass, a plurality of engaging means for engaging the meat in desired parts of the carcass, and means connected between said attachment means and said engaging means for causing said engaging means to move different distances relatively to said attachment means.

10. A device for treating an animal carcass comprising attachment means for attachment to the carcass, a plurality of prongs for engaging the meat in different portions of the carcass, and means connected between said attachment means and said prongs for shifting said prongs different distances to displace the meat different distances relatively to the frame of the carcass.

11. A device for treating an animal carcass comprising attachment means for attachment to the carcass, a plurality of engaging means for engaging the meat in different parts of the carcass, and screw-threaded operating means for causing said engaging means to be actuated different distances relatively to said attachment means to raise the meat engaged by said engaging means different distances relatively to the frame of the carcass.

12. A device for treating an animal carcass comprising a threaded shaft, a nut adapted to travel along said shaft, means for holding said nut against rotation, means for rotating said shaft, a prong extending from said nut for engaging the meat in a desired part of the carcass, and anchoring means for suspending the device from a desired point of reaction in the carcass.

13. A device for treating an animal carcass comprising a housing having a longitudinal slot in one side thereof, a threaded shaft in said housing, nuts in said housing engaging on said shaft, prongs extending from said nuts through the slot in said housing, means for rotating said shaft, and a member extending from the upper end of said housing adapted to establish anchoring attachment to the carcass.

14. A device for treating an animal carcass comprising a housing, a shaft in said housing having separate threads thereon of different pitches, nuts in said housing engaging over said threads, prongs extending from said nuts and adapted to be engaged in the meat at different parts of the carcass, means for rotating said shaft and causing said prongs to move at different rates of travel relatively to said housing, and means connected with said housing for establishing a point of anchoring attachment to the carcass.

15. A device for treating an animal carcass comprising a supporting member, screw-threaded means carried by said supporting member, meat engaging means adapted to be actuated by said screw-threaded means, and an anchoring member having pivotal connection with said supporting member and adapted to effect anchoring attachment to the carcass.

16. The method of treating an animal carcass which comprises suspending the carcass, and while the carcass is suspended shifting a part of the meat which is located forwardly of the loin in a rearward direction towards the loin and holding said meat substantially in this shifted position until the carcass has become set.

17. The method of treating a suspended beef carcass which comprises suspending the carcass, and while the carcass is suspended engaging a part of the meat on the carcass at a point below or forwardly of the rump portion of the carcass, raising this meat relatively to the frame of the carcass in a direction toward said rump portion, and holding said meat substantially in this raised position until the carcass has become set.

18. A device for treating an animal carcass comprising a plurality of engaging means for engaging the meat in desired parts of the carcass, attachment means for establishing a point of reaction spaced from said engaging means, and means connected between said engaging means and said attachment means for causing said engaging means to move different distances relatively to said attachment means.

19. The method of treating an animal carcass which comprises imposing a stress along the backbone in a direction substantially along the length of the carcass to take up any looseness between the vertebrae, and retaining the carcass substantially in this stressed condition until it has become set.

20. The method of treating an animal carcass which comprises shifting a portion of the meat on the outer side of the carcass independently of the frame of the carcass and in a direction toward the chine bone thereof, and retaining the meat substantially in this position until after the carcass has become set.

21. The method of treating an animal carcass which comprises suspending the carcass from the hind portion thereof, while the carcass is suspended displacing the meat independently of the frame of the carcass and in a direction toward the loin section of the carcass, and holding the meat substantially in this displaced position until the carcass has become set.

GRANT H. MILLER.